April 28, 1970   G. V. WOODLING   3,508,760
FLUID SEAL MEANS FOR A SHAFT AND METHOD FOR MAKING SAME
Filed Dec. 14, 1967

INVENTOR.
GEORGE V. WOODLING
BY
Woodling, Krost, Granger and Rust
attys.

United States Patent Office 3,508,760
Patented Apr. 28, 1970

3,508,760
FLUID SEAL MEANS FOR A SHAFT AND
METHOD FOR MAKING SAME
George V. Woodling, 22077 W. Lake Road,
Rocky River, Ohio 44116
Filed Dec. 14, 1967, Ser. No. 690,436
Int. Cl. F16j 15/00
U.S. Cl. 277—237     5 Claims

ABSTRACT OF THE DISCLOSURE

The subject disclosure relates to a shaft seal and features a structure and a method for making same to provide a minimum of friction. The shaft may be either a rotating shaft or a reciprocating shaft and preferably comprises a wire having a diameter residing in a range from approximately .025 to .125 of an inch. The shaft extends through a bore provided in a body consisting of a resistingly deformable mass of plastic material, preferably Teflon. The bore has a flow-back inter-lining constituting a fluid seal for sealing fluid pressure around said shaft. The flowback inter-lining is integrally secured to the body of material and comprising substantially a continuous cylindrical sealing band of body material consisting of body material forceably displaced from said body in providing said shaft-bore. The shaft-bore is determined by piercing the plastic material to a diameter larger than that of said shaft, with the pierced diameter thereafter shrinking to a diameter slightly less than that of said shaft to provide a fluid seal with a minimum of friction.

---

My invention relates to a fluid seal for a shaft and more particularly to a fluid seal having a minimum of friction.

There are certain applications where it is necessary to provide a shaft seal with a minimum of friction and still prevent fluid leakage. The requirement of providing minimum friction most often arises where the shaft is operated by low power, such as that provided by a bi-metallic thermostat in actuating a fluid valve. The problem of providing minimum shaft friction with no leakage usually involves a battle of tolerances; which, if not experienced, is little appreciated. Thus, if the shaft tolerance is too much positive, the shaft will be too tight and inoperative; and if too much negative, the shaft will be too loose and leak. If the seal tolerance is too much positive, the shaft will be too loose and leak; and if too much negative, the shaft will be too tight and inoperative. The problem of providing the proper fit between the shaft and the seal is, of course, not a new one, having existed for many years, but an inexpensive solution has baffled those in the trade. Any attempt to maintain close tolerances by machining and grinding is too expensive and costly.

An object of my invention is to provide a shaft seal with the proper fit without depending upon close machining and grinding.

Another object is to fix the diameter of the shaft-bore by a piercing operation.

Another object is to provide for making the shaft seal of a resistingly deformable body of material through which a bore of the proper dimension may be fixed by a piercing operation.

Another object is to inter-line the shaft-bore with substantially a continuous cylindrical sealing band of body material, consisting of the body material which is displaced in piercing said bore.

Another object is to provide for making the shaft of wire.

Other objects and a fuller understanding of the invention may be had by referring to the following description and claims, taken in conjunction with the accompanying drawings, in which:

Figure 6:
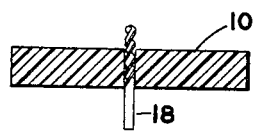
FIGURE 6 shows a body of plastic material in the process of having a hole drilled therethrough.
Figure 7:
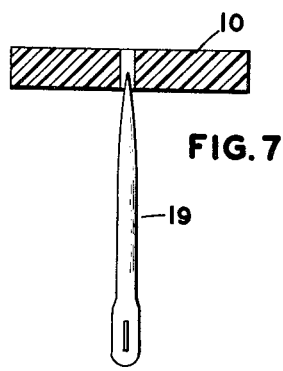
Figure 8:
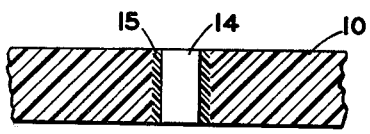

FIGURE 7 shows the body of plastic material of FIGURE 6, in the process of having the drilled hole pierced by a needle having a larger diameter than that of drilled hole; and FIGURE 8 is an enlarged cross-sectional view of a body of plastic material showing the shaft-bore inter-lined with substantially a continuous cylindrical sealing band of body material, consisting of the body material which is displaced in piercing said bore.

Figure 1:
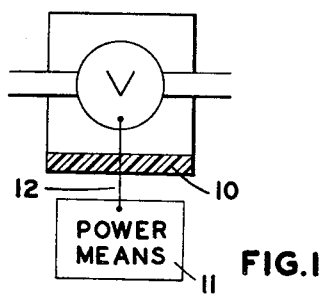
FIGURE 1 is a diagrammatic view of a rotary valve embodying my shaft seal.

With reference to FIGURE 1, my shaft seal may be embodied in a rotary valve, as diagrammatically illustrated. The rotary valve is shown as having a body 10 consisting of a resistingly deformable mass of plastic material, preferably Teflon. The body 10 separates the pressurized fluid in the valve from atmosphere. The rotary valve is disposed to be actuated by suitable rotary power means 11 and a shaft 12 extending through a shaft-bore provided in the Teflon body 10 and connected to the rotary valve.

Figure 2:
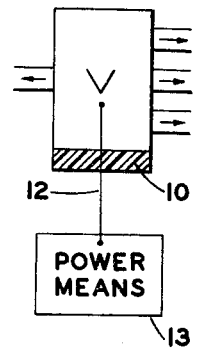
FIGURE 2 is a diagrammatic view of a reciprocating valve embodying my shaft seal.

FIGURE 2 shows my shaft seal embodied in a reciprocating valve, as diagrammatically illustrated. The reciprocating valve is shown as also having a body 10, like that in FIGURE 1, which separates the pressurized fluid in the valve from atmosphere. The reciprocating valve is disposed to be actuated by suitable reciprocating power means 13 and a shaft 12, like that in FIGURE 1. The shaft 12 is preferably made of wire having a diameter residing in a range from approximately .025 to .125 of an inch. The power means may be of low power such as that delivered by a bi-metallic thermostat and by reason of the low power, the shaft seal is required to have a minimum of friction, otherwise the power means will not be able to operate the shaft.

Figure 3:
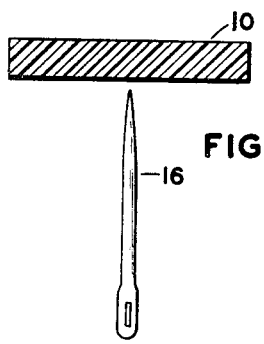
FIGURE 3 shows a cross-sectional view of a body of plastic material from which my shaft seal may be made, the view also showing a piercing needle preparatory to piercing a shaft-bore in the body of plastic material.
Figure 4:
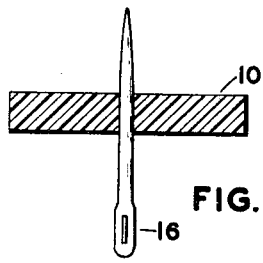
FIGURE 4 is a view similar to FIGURE 3, and shows the needle piercing the body of plastic material.

The diameter of the shaft-bore is fixed by a piercing operation. The shaft-bore is shown enlarged in FIGURE 8 and is identified by the reference character 14. FIGURE 3 shows a body 10, in readiness, to be pierced by a needle 16 having a straight cylindrical shank with a sharp piercing point. FIGURE 4 shows the needle 16 penetrating the body 10. In practice, I find that for a .039 inch wire-shaft, the shank of the piercing needle may be .056 inch. Upon removing the needle from the plastic body, the bore will shrink and become fixed at a diameter slightly less than that of the shaft to provide a fluid seal with a minimum of friction. The needle is preferably rotated as it pierces the plastic body. The needle does not rupture the plastic body but makes a clean and smooth cylindrical sealing bore. The wire-shaft is also clean and smooth, preferably stainless steel, and when it is mounted into a clean and smooth shaft-bore, the friction is at a minimum. The piercing operation has the after-effect of producing a flow-back inter-lining in the shaft-bore 14 comprising substantially a continuous cylindrical sealing band 15 integrally secured to the body material and consisting of the body material forceably displaced in piercing the shaft-bore. The continuous cylindrical sealing band 15 is illustrated by the compacted shading in FIGURE 8.

In making my shaft seal, it is not necessary to be concerned about matching tolerances. The piercing, itself, takes care of the tolerance problem. The plastic material which constitutes the flow-back inter-lining in the bore appears to take a permanent set after the needle is withdrawn, whereby the shaft-bore, likewise, becomes stable at a fixed diameter. The above described procedure in operation will repeatedly produce shaft seals with consistent performance having a minimum of friction. Notwithstanding the minimum friction, the shaft seal will withstand high fluid pressures exceeding the pressure rating of the valve.

Figure 5:
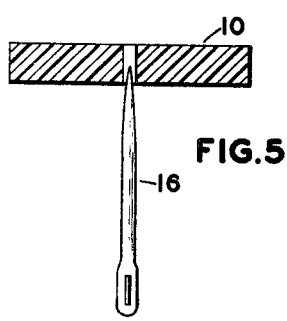
FIGURE 5 shows the body of plastic material of FIGURE 4, in the process of being re-pierced by the needle.

An alternate procedure, involving a double piercing operation, may be made in carrying out my invention. Let it be assumed that the shaft-bore is for a .039 inch shaft wire, as before described. In the double piercing operation, a .050 inch diameter needle is used instead of the .056 inch diameter needle used in the single piercing operation. After a first pierce is made with a .050 needle, the plastic body is preferably allowed to take a set for at least about 10 to 15 minutes. Then, the same pierced bore is repierced with the .050 inch diameter needle. Upon withdrawing the .050 inch diameter needle in the second piercing operation, the bore becomes stable at a fixed diameter slightly less than that of shaft shaft to provide a fluid seal with a minimum of friction. The double piercing procedure in operation will repeatedly produce shaft seals with consistent performance and is illustrated by the views of FIGURES 3, 4 and 5, where the needle 16 in all the views has a .050 inch diameter. The FIGURE 5 shows the second piercing operation and FIGURES 3 and 4 show the first piercing operation. In the single and double piercing operations, the body of plastic material has the capability of being displaced substantially radially outwardly from a line extending through said mass and substantially coinciding with the axis of the bore.

FIGURES 6 and 7 show how my invention may be practiced by a first drilling operation, followed by a second piercing operation. Let it be assumed that the shaft-bore in FIGURES 6 and 7 is for a .0625 inch diameter wire-shaft. In this drilling-piercing operation, the drill 18 may have a .040 inch diameter and the piercing needle 19 may have a .075 inch diameter. My drilling-piercing operation in operation will repeatedly produce shaft seals with consistent performance with a minimum of friction.

In practicing the procedures of my invention the shaft-bore is fixed by a needle-piercing operation. It is the needle-piercing operation which has the after-effect of producing the flow-back inter-lining 15 in the shaft-bore 14 as illustrated in FIGURE 8.

The material which is radially pressed outwardly in the piercing operation defines the diameter of the shaft-bore and may be referred to as a mass of positive expansion material. In this application, the substantially continuous cylindrical sealing band 15, defining the flow-back inter-lining, is considered to have an inner circumference defined by the diameter of the shaft-bore and an outer circumference which defines with said inner circumference the mass of positive expansion material.

For the piercing procedure, the diameter of the shaft-bore is fixed by the piercing needle and may have a (positive expansion) diameter residing in a diameter range expressed by the following equation:

$$\sqrt{\frac{2(D-NF)^2}{1\times\left[\frac{(D-NF)^2+2R^2}{(D-NF)^2}\right]}} \pm .005 \text{ of an inch}$$

where D is the diameter of the shaft; NF, the negative fit; and R, the radius of the drilled hole, if any.

In the single piercing procedure, let it be assumed that the diameter of the wire-shaft is .039 of an inch. To have a minimum friction, with no fluid leakage, the shaft-bore may be approximately .0025 of an inch smaller than that of the wire-shaft, which means that the shaft-bore has a diameter of approximately .0365 of an inch. In this example, since the diameter of the shaft-bore of .0365 of an inch is smaller than the diameter of said shaft of .039 of an inch, the fit between the shaft and the shaft-bore may be characterized as a negative diameter fit, and in practice may preferably be less than .010 of an inch. When the wire-shaft is mounted in the shaft-bore, the flow-back interlining will make a good fluid seal with the wire-shaft. By substituting the above assumed values in the equation, it is determined that the piercing needle will have a diameter residing in a diameter range of approximately .047 to .057 of an inch. A needle diameter of approximately .056 of an inch may be selected as falling within the calculated diameter range.

For the double piercing procedure, the needle may be substantially ten (10) percent smaller in diameter than that for the single piercing procedure. Thus, a needle diameter of approximately .050 of an inch may be selected for the double-piercing procedure, which falls within the calculated diameter range. The smaller needle diameter used in the double-piercing procedure will, however, produce a resultant effect, whereby the outer circumference of the flow-back interlining is substantially the same as that produced by the .056 diameter needle in the single piercing procedure. Thus, in both the single-piercing procedure and the double-piercing procedure, the cross-sectional area between the inner and the outer circumferences of the flow-back interlining are substantially the same That is to say, the wall thickness of the flow-back interlining will be substantially the same in both cases.

For the drilling-piercing procedure, the wall thickness of the flow-back interlining will be less than what it would have been had the entire area been pierced and expanded as in the single and double piercing procedure. For a drilled bore having a .040 inch diameter and for a wire-shaft having a .0625 inch diameter and a negative fit of .0025 of an inch, the calculated diameter for the needle in the drilling-piercing procedure will reside in a diameter range from approximately .066 to .076 of an inch. A needle diameter of approximately .075 of an inch may be selected as falling within the calculated diameter range. In all three procedures, the piercing operation provides substantially a continuous cylindrical sealing band. Thus, the piercing operation does not rupture the body material. The rupturing is prevented by keeping the wall thickness continuous and in this regard the drilling-piercing operation is preferable for the larger sizes of wire-shafts.

What is claimed is:

1. Fluid seal means for a shaft having a diameter residing in a range of approximately .025 to .125 of an inch, said fluid seal means including a body of material comprising a resistingly deformable mass, said body having substantially a cylindrical shaft-bore provided therein, said body having a mass of positive expansion material displaced substantially radially outwardly to provide said shaft-bore, said shaft-bore having an interlining constituting a fluid seal for sealing fluid pressure around said shaft, said interlining comprising flow-back material integrally secured to said body and comprising substantially a continuous cylindrical band of body material, said substantially a continuous cylindrical sealing band having an inner circumference defined by a diameter making a negative diameter fit with said shaft of less than .010 of an inch and having an outer circumference defined by a positive expansion diameter larger than the diameter of said shaft, said body having a mass of substantially undeformed material surrounding said positive expansion material.

2. The structure of claim 1, wherein said mass comprises plastic material.

3. The structure of claim 2, wherein said plastic material comprises Teflon.

4. The structure of claim 1, wherein said shaft comprises a wire.

5. The structure of claim 3, wherein said shaft-bore has a positive expansion diameter substantially residing in a diameter range expressed by the following equation:

$$\sqrt{\frac{2(D-NF)^2}{1 \times \left[\frac{(D-NF)^2+2R^2}{(D-NF)^2}\right]}} \pm .005 \text{ of an inch}$$

where D is the diameter of said shaft; NF, the negative diameter fit; and $R_1$ the radius of a drilled hole when present.

References Cited

UNITED STATES PATENTS

| | | |
|---|---|---|
| 3,092,439 | 6/1963 | Harrison 264—154 |
| 3,429,752 | 2/1969 | Sundberg 264—154 X |

FOREIGN PATENTS

| | | |
|---|---|---|
| 166,588 | 12/1958 | Australia. |
| 1,052,758 | 3/1959 | Germany. |

LAVERNE D. GEIGER, Primary Examiner

J. S. MEDNICK, Assistant Examiner

U.S. Cl. X.R.

264—154